United States Patent Office.

JAKOB SCHMID, OF BASLE, SWITZERLAND, ASSIGNOR TO THE SOCIETY OF CHEMICAL INDUSTRY IN BASLE, OF SAME PLACE.

BLACKISH-BLUE AZO DYE.

SPECIFICATION forming part of Letters Patent No. 493,563, dated March 14, 1893.

Application filed September 1, 1892. Serial No. 444,820. (Specimens.) Patented in France March 28, 1892, No. 220,468.

*To all whom it may concern:*

Be it known that I, JAKOB SCHMID, a citizen of Switzerland, residing at Basle, Switzerland, have invented new and useful Improvements in the Production of a Blackish-Blue Azo Coloring-Matter or Dye-Stuff, (for which I have received Letters Patent in France, No. 220,468, dated March 28, 1892,) of which the following is a specification.

Mono-sulpho-dioxy-naphthoic acid, for which the Society of Chemical Industry in Basle has obtained Letters Patent in France, No. 219,875, dated March 4, 1892, has the property to combine with equal molecular proportions of benzidin, tolidin, ethoxy-benzidin and dianisidin in forming new intermediate products which contain a further diazo-group and which can be converted for instance by one molecular proportion of (1.4) alpha-naphthol-alpha-sulphonic acid of Nevile & Winther into useful coloring matters dyeing from blackish-violet to blackish-blue.

My invention relates to the production of a blackish blue azo dyestuff represented by the formula:

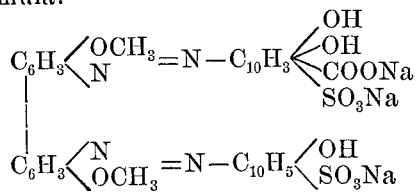

obtained by combination of molecular proportions of the tetrazo compound of dianisidin with the sodium salt of mono-sulpho-dioxy-naphthoic acid; and (1.4) alpha-naphthol-alpha-sulphonic acid of Nevile & Winther.

In carrying out my invention practically I proceed as follows: 6.1 kilos of dianisidin are dissolved in a mixture of 16 kilos of muriatic acid and one hundred liters of water. The solution is cooled down to 5° centigrade and diazotized with 3.5 kilos of sodium nitrite dissolved in 30 liters of water. The filtered tetrazo-compound is introduced into a cold solution of 8.2 kilos of the sodium salt of mono-sulpho-dioxy-naphthoic acid. By cautiously adding some acetate of sodium or soda, the reaction is effected and the formation of the intermediate product is completed after standing for about one hour. It is converted into the new dyestuff by addition of an alkaline solution of 6.5 kilos of (1.4) alpha-naphthol-alpha-sulphonic acid of Nevile & Winther. After twelve hours repose the product of the reaction is heated up to 80° centigrade and the coloring matter precipitated with common salt, filtered and dried. It is a grayish-black glittering powder of a metallic luster, easily soluble in water with a blackish-blue, in concentrated sulphuric acid with a green-blue coloration, difficultly soluble in alcohol and insoluble in benzine and ether. It dyes unmordanted cotton blackish-blue indigo like shades.

I do not claim in this application for a patent the production of mono-sulpho-dioxy-naphthoic acid which forms the subject matter of a separate application for a patent filed by myself and R. Paganini, August 25, 1892, Serial No. 444,103.

What I claim as new, and desire to secure by Letters Patent, is—

1. The process for manufacturing a blackish-blue azo-coloring matter by combination of one molecular proportion of diazotized dianisidin with one molecular proportion of the sodium salt of mono-sulpho-dioxy-naphthoic acid, combining the obtained new intermediate product with an alkaline solution of one molecular proportion of (1.4) alpha-naphthol-alpha-sulphonic acid of Nevile & Winther and precipitating with common salt.

2. The new blackish-blue azo dyestuff which can be derived from equal molecular proportions of diazotized dianisidin, the sodium salt of mono-sulpho-dioxy-naphthoic acid and (1.4) alpha-naphthol-alpha-mono-sulphonic acid of Nevile & Winther and which is a grayish-black glittering powder of a metallic luster, easily soluble in water with a blackish-blue, in concentrated sulphuric acid with a green-blue coloration, difficultly soluble in alcohol and insoluble in ether and benzine.

In testimony whereof I have hereunto set my hand and seal in the presence of two subscribing witnesses.

JAKOB SCHMID. [L. S.]

Witnesses:
GEORGE GIFFORD,
F. WALTER.